(12) United States Patent
Levin et al.

(10) Patent No.: US 10,882,035 B2
(45) Date of Patent: Jan. 5, 2021

(54) PALLADIUM CATALYSTS WITH IMPROVED PERFORMANCE IN BIOLOGICAL ENVIRONMENTS

(71) Applicant: Promega Corporation, Madison, WI (US)

(72) Inventors: Sergiy Levin, San Luis Obispo, CA (US); Rachel Friedman Ohana, Fitchburg, WI (US); Thomas Kirkland, Atascadero, CA (US); Keith Wood, Mt. Horeb, WI (US)

(73) Assignee: Promega Corporation, Madison, WI (US)

(*) Notice: Subject to any disclaimer, the term of this patent is extended or adjusted under 35 U.S.C. 154(b) by 82 days.

(21) Appl. No.: 15/591,842

(22) Filed: May 10, 2017

(65) Prior Publication Data

US 2018/0029028 A1    Feb. 1, 2018

Related U.S. Application Data

(60) Provisional application No. 62/334,043, filed on May 10, 2016.

(51) Int. Cl.
| | | |
|---|---|---|
| *B01J 31/24* | (2006.01) | |
| *C07B 63/04* | (2006.01) | |
| *B01J 31/28* | (2006.01) | |
| *C07F 15/00* | (2006.01) | |

(52) U.S. Cl.
CPC ........... *B01J 31/2404* (2013.01); *B01J 31/24* (2013.01); *B01J 31/28* (2013.01); *C07B 63/04* (2013.01); *C07F 15/006* (2013.01); *C07F 15/0066* (2013.01); *B01J 2231/005* (2013.01); *B01J 2531/824* (2013.01); *B01J 2540/225* (2013.01); *B01J 2540/32* (2013.01)

(58) Field of Classification Search
None
See application file for complete search history.

(56) References Cited

U.S. PATENT DOCUMENTS

| | | | |
|---|---|---|---|
| 3,437,428 | A | 4/1969 | Quesada et al. |
| 4,196,135 | A | 4/1980 | Enomoto et al. |
| 5,600,047 | A | 2/1997 | Mandai et al. |
| 5,631,393 | A | 5/1997 | Kohlpaintener et al. |
| 8,530,664 | B2 | 9/2013 | Pianzola et al. |

(Continued)

FOREIGN PATENT DOCUMENTS

| | | | |
|---|---|---|---|
| CN | 103962166 | * | 8/2014 |
| CN | 105363436 | | 3/2016 |
| DE | 10123884 | | 11/2002 |

(Continued)

OTHER PUBLICATIONS

Shaughnessy Chem. Rev., 109, 643-710 (Year: 2009).*

(Continued)

*Primary Examiner* — Yun Qian
(74) *Attorney, Agent, or Firm* — Casimir Jones, S.C.; Anne M. Reynolds

(57) ABSTRACT

Provided herein are palladium (Pd) catalysts with improved performance in biological environments. In particular, formulations, methods of preparations, and storage conditions are provided that provide improved performance of Pd catalysts under protein-rich conditions.

15 Claims, 16 Drawing Sheets

(56) References Cited

U.S. PATENT DOCUMENTS

2014/0371446 A1    12/2014    Shekhar et al.

FOREIGN PATENT DOCUMENTS

| JP | 2000-319254 | | 11/2000 | |
|---|---|---|---|---|
| KR | 20150136076 | | 12/2015 | |
| WO | WO 2011045417 | * | 4/2011 | ............. B01J 31/24 |
| WO | WO 2013/095137 | | 6/2013 | |
| WO | WO 2017/196985 | | 11/2017 | |

OTHER PUBLICATIONS

A translation of CN 103962166 to Li et al.*

Amatore et al., New synthetic applications of water-soluble acetate Pd/TPPTS catalyst generated in Situ. evidence for a true Pd(0) species intermediate. J. Org. Chem., 1995;60(21):6829-39.

Balbino et al., The Multiple Roles of Imidazolium Ionic Liquids in Transition-Metal Catalysis: The Palladium-Catalyzed Telomerization of 1,3-Butadiene with Acetic Acid. Chem Cat Chem, 2015;7:972-7.

Bumagin et al., An Effective Activation of Palladium Phosphine Complexes in Aqueos Phase Reactions of Heteroaromatic Boronic Acids with Aryl Halides. Chemistry of Heterocyclic Compounds, 2014;50(1):24-31.

Kiick et al., Incorporation of azides into recombinant proteins for chemoselective modification by the Staudinger ligation. PNAS, 2002;99(1):19-24.

Kuntz et al., Redox chemistry of Pd2+, Pt2+, Rh3+—TPPTS systems in water: pH influence on the preparation of low valent TPPTS complexes. J Mol Cat A: Chem 1998;129(2-3):159-71.

Peral et al., Strong π-Acceptor Sulfonated Phosphines in Biphasic Rhodium catalyzed Hydroformylation of Polar Alkenes. Catal. Sci. Techno., 2016; Supplemental Material, 16 pages.

Toreki, Phosphine Complexes—Organometallic HyperTextBook. Last updated Mar. 31, 2015. www.llpi.com/organomet/phosphine.html. Retrieved Jul. 14, 2017, 4 pages.

International Search Report and Written Opinion for PCT/US2017/031965, dated Aug. 11, 2017, 16 pages.

Leriche et al., leavable Linkers in Chemical Biology. Bioorg Med Chem. Jan. 15, 2012:20(2):571-82.

Ohana et al., Improved Deconvolution of Protein Targets for Bioactive Compounds Using a Palladium Cleavable Chloroalkane Capture Tag. ACS Chem Biol. Sep. 16, 2016;11(9):2608-17.

Prinz et al., Biphasic Catalyzed Telomerization of Butadiene and Ammonia Kinetics and New Ligands for Regiosleective Reactions. Chem. Eur. J. 1999;5(7):2069-76.

Supplementary European Search Report for EP 17796767, dated Nov. 27, 2019, 10 pages.

\* cited by examiner

*t-Bu-Amphos*

*Xantphos-S*

*Cy-Amphos*

*BDSPPB*

*o-DANPHOS*

*p-DAN2PHOS*

*o-DANPHOS*

*o-DAN2PHOS*

*DANPHOS*

*DAN2PHOS*

PALLADIUM CATALYSTS WITH IMPROVED PERFORMANCE IN BIOLOGICAL ENVIRONMENTS

CROSS-REFERENCE TO RELATED APPLICATIONS

The present invention claims the priority benefit of U.S. Provisional Patent Application 62/334,043, filed May 10, 2016, which is incorporated by reference in its entirety.

FIELD

Provided herein are palladium (Pd) catalysts with improved performance in biological environments. In particular, formulations, methods of preparation, and storage conditions are provided that provide improved performance of Pd catalysts under protein-rich conditions.

BACKGROUND

Palladium compounds are useful catalysts in a variety of different reactions. Examples include: Negishi coupling between an organohalide and an organozinc compound, Heck reaction between alkenes and aryl halides, Suzuki reaction between aryl halides and boronic acids, Stille reaction between organohalides and organotin compounds, Hiyama coupling between organohalides and organosilicon compounds, Sonogashira coupling between aryl halides and alkynes (with copper(I) iodide as a co-catalyst), Buchwald-Hartwig amination of an aryl halide with an amine, Kumada coupling of Grignard reagents and aryl or vinyl halides, Tsuji-Trost Reaction (Trost Allylation) between allylic compounds and various nucleophiles and Heck-Matsuda reaction of an arenediazonium salt with an alkene. These reactions all rely on palladium in the 0 oxidation state (Pd(0)).

Although numerous Pd catalysts and pre-catalysts exist for various applications in organic chemistry, a vast majority of them are used for performing reactions in organic solvents and are usually prepared in situ. Specifically, no method for preparing in advance and storing a palladium catalyst that is functional in a biological or proteinaceous environment has been previously described.

SUMMARY

Provided herein are palladium (Pd) catalysts with improved performance in biological environments. In particular, formulations, methods of preparation, and storage conditions are provided that provide improved performance of Pd catalysts under protein-rich conditions such as those present in a biological environment.

In some embodiments, provided herein are Pd catalyst compositions comprising phosphine-coordinated palladium ions, wherein a phosphine ligand is present at 6-12 fold excess over palladium in the composition. In some embodiments, the phosphine ligand is a strong π-acceptor aryl phosphine. In some embodiments, the phosphine ligand is a DANPHOS family compound. In some embodiments, the phosphine ligand is selected from the group consisting of DANPHOS, o-DANPHOS, p-DANPHOS, DAN2PHOS, o-DAN2PHOS, p-DAN2PHOS, and DANPHOS/DAN2PHOS derivatives with alternative solubilizing groups (e.g., COOH and/or $SO_2NH_2$ in place of one or more $SO_3^-$ substituents).

In some embodiments, the phosphine ligand is o-DANPHOS. In some embodiments, the palladium is provided as a Palladium(II) salt selected from the group consisting of: Palladium acetate ($Pd(OAc)_2$), Palladium trifluoroacetate ($Pd(TFA)_2$), Palladium nitrate ($Pd(NO_3)_2$), Palladium chloride ($PdCl_2$), Palladium bromide ($PdBr_2$), Sodium tetrachloropalladate ($Na_2PdCl_4$), Potassium tetrachloropalladate ($K_2PdCl_4$), Lithium tetrachloropalladate ($Li_2PdCl_4$), Sodium tetrabromopalladate ($Na_2PdBr_4$), Potassium tetrabromopalladate ($K_2PdBr_4$), $Pd_2$(dibenzylideneacetone)$_3$, Pd(dibenzylideneacetone)$_2$, and Buchwald precatalysts. In some embodiments, the phosphine-coordinated palladium ions are in aqueous solution. In some embodiments, the phosphine-coordinated palladium species (Pd(0)) are in a lyophilized state (e.g., freeze dried, powder, etc.).

In some embodiments, provided herein are methods for the preparation of a Pd catalyst, comprising combining a palladium (II) salt with a phosphine ligand in un-buffered water. In some embodiments, provided herein are methods for the preparation of a Pd catalyst, comprising combining a palladium(II) salt with a phosphine ligand in buffered water (e.g., buffered in a non-coordinating buffer). In some embodiments, the phosphine is water soluble. In some embodiments, the phosphine ligand is a strong π-acceptor aryl phosphine. In some embodiments, the phosphine ligand is a DANPHOS family compound. In some embodiments, the phosphine ligand is selected from the group consisting of DANPHOS, o-DANPHOS, p-DANPHOS, DAN2PHOS, o-DAN2PHOS p-DAN2PHOS. In some embodiments, the phosphine ligand is o-DANPHOS. In some embodiments, the palladium is provided as a Palladium(II) salt selected from the group consisting of: Palladium acetate ($Pd(OAc)_2$), Palladium trifluoroacetate ($Pd(TFA)_2$), Palladium nitrate ($Pd(NO_3)_2$), Palladium chloride ($PdCl_2$), Palladium bromide ($PdBr_2$), Sodium tetrachloropalladate ($Na_2PdCl_4$), Potassium tetrachloropalladate ($K_2PdCl_4$), Lithium tetrachloropalladate ($Li_2PdCl_4$), Sodium tetrabromopalladate ($Na_2PdBr_4$), and Potassium tetrabromopalladate ($K_2PdBr_4$). In some embodiments, the un-buffered water is oxygen-depleted water. In some embodiments, methods further comprise a step of degassing the water prior to the combining step. In some embodiments, the palladium(II) salt and the phosphine ligand are combined by stirring or agitation. In some embodiments, methods further comprise a step of dissolving the palladium(II) salt in water and dissolving the phosphine ligand in water prior to the combining step. In some embodiments, methods further comprise a step of buffering the Pd catalyst after the combining step. In some embodiments, the Pd catalyst is buffered at a pH between 6.5-8.0 (e.g., pH 6.5, pH 6.6, pH 6.7, pH 6.8, pH 6.9, pH 7.0, pH 7.1, pH 7.2, pH 7.3, pH 7.4, pH 7.5, pH 7.6, pH 7.7, pH 7.8, pH 7.9, pH 8.0, or any ranges therebetween). In some embodiments, methods further comprise a step of lyophilizing the Pd catalyst. In some embodiments, methods further comprise a step of reconstituting the Pd catalyst in buffer. In some embodiments, the buffer is HEPES or MOPS. In some embodiments, the combining step is performed under inert atmosphere (e.g., argon or nitrogen gas).

In some embodiments, compositions are provided comprising Pd catalysts produced by the methods described herein (e.g., the methods of the preceding paragraph).

In some embodiments, provided herein are methods of storing a Pd catalyst, comprising one or more steps of: (i) lyophilizing an aqueous solution of the Pd catalyst to dryness, (ii) storing the Pd catalyst in an unbuffered state (or buffered in a non-coordinating buffer), (iii) excluding molecular oxygen from the Pd catalyst, (iv) storing at a reduced temperature, and (v) storing is a sealed container. In some embodiments, the container material exhibits low permeability to molecular oxygen. In some embodiments, the container is impermeable to molecular oxygen (e.g., glass). In some embodiments, a method comprises 2, 3, 4, 5, or more steps.

DEFINITIONS

Figure 1A:
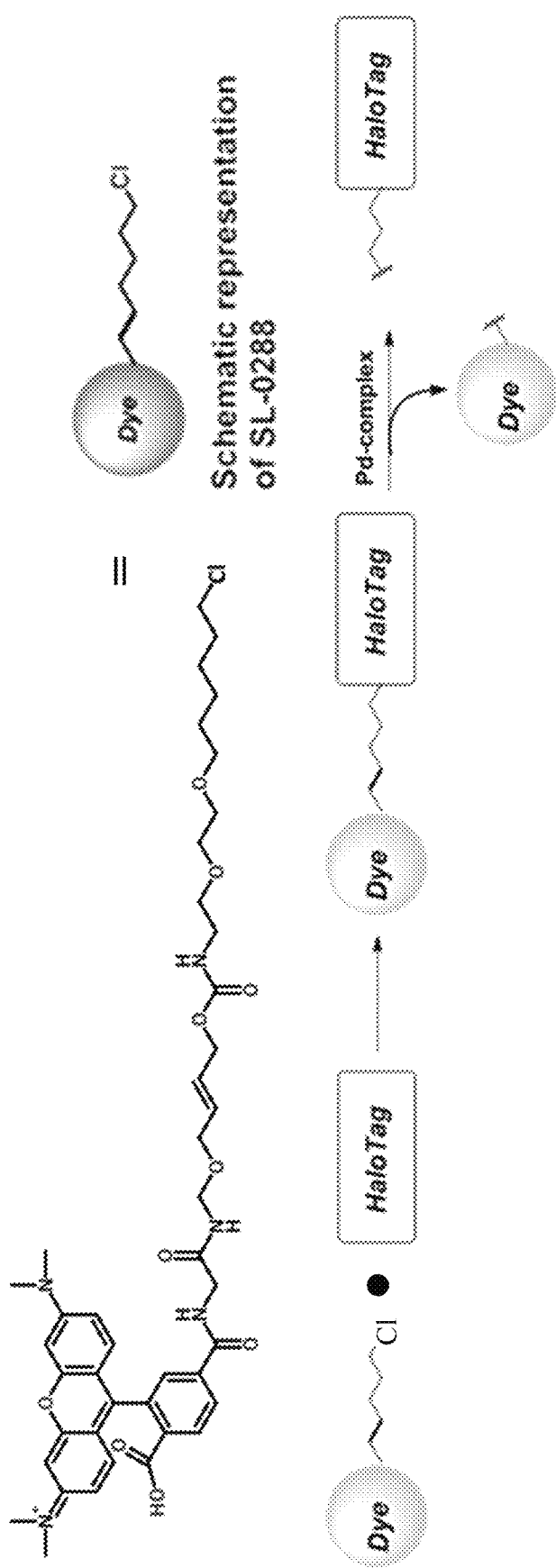
FIGS. 1A-1B show the influence of phosphine and nucleophile on cleavage efficiency in a proteinaceous environment.

Although any methods and materials similar or equivalent to those described herein can be used in the practice or testing of embodiments described herein, some preferred methods, compositions, devices, and materials are described herein. However, before the present materials and methods are described, it is to be understood that this invention is not limited to the particular molecules, compositions, methodologies or protocols herein described, as these may vary in accordance with routine experimentation and optimization. It is also to be understood that the terminology used in the description is for the purpose of describing the particular versions or embodiments only, and is not intended to limit the scope of the embodiments described herein.

Unless otherwise defined, all technical and scientific terms used herein have the same meaning as commonly understood by one of ordinary skill in the art to which this invention belongs. However, in case of conflict, the present specification, including definitions, will control. Accordingly, in the context of the embodiments described herein, the following definitions apply.

As used herein and in the appended claims, the singular forms "a", "an" and "the" include plural reference unless the context clearly dictates otherwise. Thus, for example, reference to "a Pd catalyst" is a reference to one or more Pd catalysts and equivalents thereof known to those skilled in the art, and so forth.

As used herein, the term "comprise" and linguistic variations thereof denote the presence of recited feature(s), element(s), method step(s), etc. without the exclusion of the presence of additional feature(s), element(s), method step(s), etc. Conversely, the term "consisting of" and linguistic variations thereof, denotes the presence of recited feature(s), element(s), method step(s), etc. and excludes any unrecited feature(s), element(s), method step(s), etc., except for ordinarily-associated impurities. The phrase "consisting essentially of" denotes the recited feature(s), element(s), method step(s), etc. and any additional feature(s), element(s), method step(s), etc. that do not materially affect the basic nature of the composition, system, or method. Many embodiments herein are described using open "comprising" language. Such embodiments encompass multiple closed "consisting of" and/or "consisting essentially of" embodiments, which may alternatively be claimed or described using such language.

As used herein, the term "proteinaceous environment" or "protein-rich environment" refers to local conditions having a protein concentration greater than 0.1 mg/ml. A "highly proteinaceous environment" refers to local conditions having a protein concentration greater than 10 mg/ml.

As used herein, the term "coordinated" refers to the interaction between an electron-donating ligand (e.g., phosphine) and an electron-accepting metal (e.g. Palladium), and the formation of coordinate covalent bonds (dipolar bonds) therebetween.

As used herein, the term "unbuffered" refers to a solution (or water) without the addition of a buffer to resist changes in pH.

DETAILED DESCRIPTION

Provided herein are palladium (Pd) catalysts with improved performance in biological environments. In particular, formulations, methods of preparations, and storage conditions are provided that provide improved performance of Pd catalysts under protein-rich conditions.

1. Catalyst Formulation

In some embodiments, a Pd catalyst is provided. In some embodiments, the Pd catalyst comprises a water-soluble Pd complex. In some embodiments, the Pd is complexed by one or more water-soluble organic phosphine ligands. In some embodiments, the Pd is coordinated by a ligand in a Pd(0) state. In some embodiments, the Pd catalyst is generated by the interaction of a Pd salt with a suitable ligand (e.g., a DANPHOS ligand). In some embodiments, a palladium(II) salt is used as a source of palladium. In some embodiments, a suitable Palladium(II) salt is selected from the group including but not limited to: Palladium acetate ($Pd(OAc)_2$), Palladium trifluoroacetate ($Pd(TFA)_2$), Palladium nitrate ($Pd(NO_3)_2$), Palladium chloride ($PdCl_2$), Palladium bromide ($PdBr_2$), Sodium tetrachloropalladate ($Na_2PdCl_4$), Potassium tetrachloropalladate ($K_2PdCl_4$), Lithium tetrachloropalladate ($Li_2PdCl_4$), Sodium tetrabromopalladate ($Na_2PdBr_4$), and Potassium tetrabromopalladate ($K_2PdBr_4$).

Figure 2:
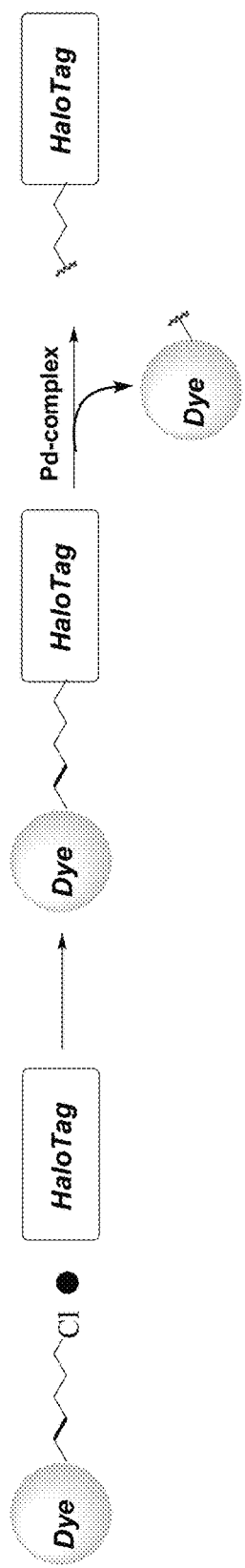
FIG. 2 shows the influence of catalyst composition on cleavage efficiency in a proteinaceous environment.
Figure 2:
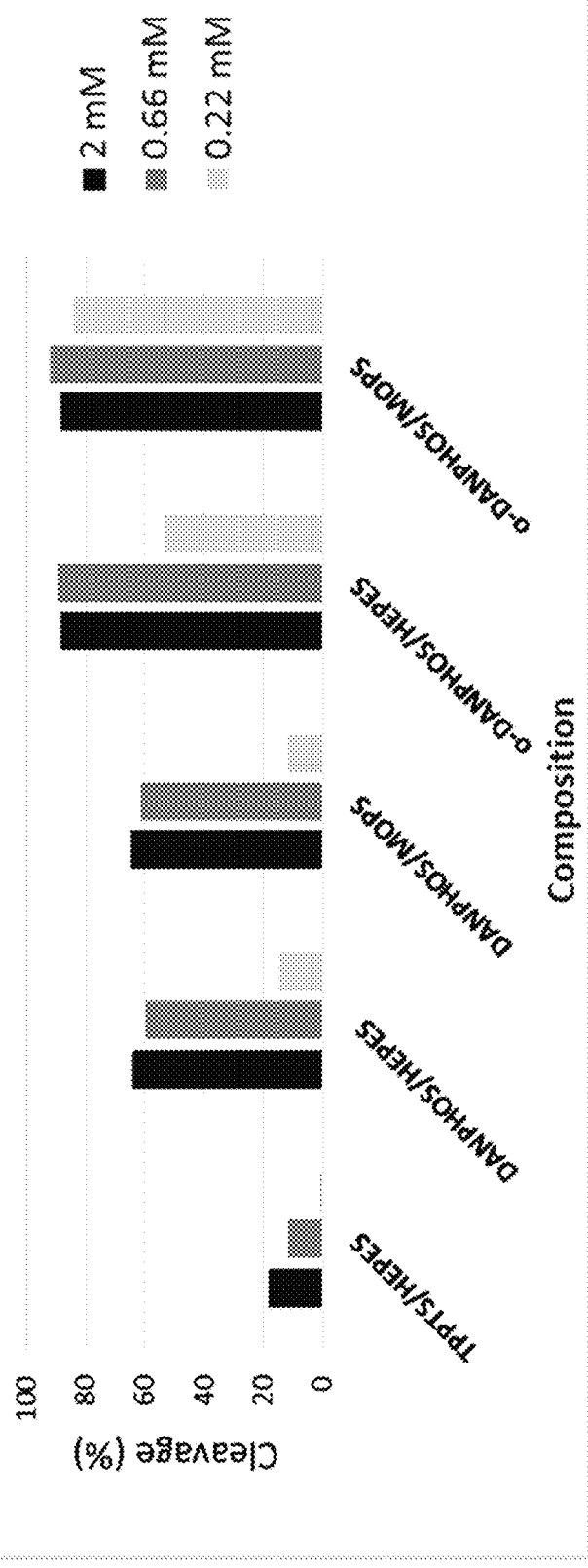

In some embodiments, a palladium is coordinated by a phosphine ligand (e.g., water soluble ligand). Examples of phosphines that find use in Pd-coordination for the formation of the catalysts herein include but are not limited to: m-TPPTS, m-TPPDS, m-TPPMS, TXPTS, TXPDS, TMAPTS, m-TPPTC, m-TPPDC, p-TPPTC, p-TPPDC, o-TPPDC, o-TPPTC, m-TPPTG, m-TPPDG, m-TPPMG, Cy-Amphos, t-Bu-Amphos, BDSPPB, Xantphos-S, DANPHOS, o-DANPHOS, p-DANPHOS, DAN2PHOS o-DAN2PHOS p-DAN2PHOS, etc. (See, e.g., FIG. 2). In particular embodiments, Pd catalysts herein comprise Pd coordinated by a DANPHOS family compound (e.g., FIG. 6B; DANPHOS, o-DANPHOS, p-DANPHOS, DAN2PHOS o-DAN2PHOS p-DAN2PHOS, etc.). In certain embodiments, Pd catalysts herein comprise Pd (e.g., Pd(0)) coordinated by an o-DANPHOS.

Experiments conducted during development of embodiments herein have demonstrated that Pd-catalysts derived from phosphines of DANPHOS compounds (e.g., o-DANPHOS) provide superior catalytic activity (e.g., cleavage of an allyl-carbamate linkage) and provide particularly better performance in a biological environment, e.g., a proteinaceous environment, when compared to other water-soluble phosphines. DANPHOS compounds (e.g., o-DANPHOS) specifically outperformed the commonly used phosphine TPPTS.

2. Pd:Phosphine Ratio

Experiments conducted during development of embodiments herein demonstrate improved catalytic performance by phosphine (e.g., DANPHOS family (e.g., o-DANPHOS))-coordinated Pd catalysts when excess phosphine is present over Pd. For example, experiments conducted during the development of embodiments herein demonstrate an optimal ratio of Pd to phosphine (e.g., DANPHOS compound (e.g., o-DANPHOS, etc.), etc.) to be between 1:6 and 1:12 (e.g., 1:6, 1:7, 1:8, 1:9, 1:10, 1:11, 1:12, and ranges therebetween (e.g., 1:8 to 1:10). Such a finding was unexpected, as it is known that for many catalytic metal complexes, the active catalytic specie is a metal center coordinated by one or two coordination ligands (e.g., phosphines). It was expected that too much phosphine would result in complete saturation of the metal coordination sphere resulting in very little, if any, active catalyst, leading to diminished reactivity and slow reaction rates. Therefore, it was unexpected that the excess phosphine improved catalytic performance, particularly in a biological environment, e.g., a protein-rich environment.

3. Preparation

In general, catalytically active Pd(0) catalysts are unstable. For organic chemistry applications, they are usually prepared in situ. One notable exception is Pd(PPh$_3$)$_4$-tetrakis(triphenylphosphine)palladium(0). Formation of an active Pd(PPh$_3$)$_4$ catalyst is typically accomplished by reacting Pd(II) salt with excess ligand (e.g., phosphine). Phosphine acts as both the ligand and the reducing agent. The rate of reduction depends on the nature of the ligand (e.g., phosphine) and other reaction parameters. (See, e.g., U.S. Pat. No. 8,981,086; incorporated by reference in its entirety).

Experiments conducted during development of embodiments herein have demonstrated that catalyst generated by in situ reduction does not provide efficient catalysis (e.g., cleavage of an allyl-carbamate linkage) in a biological environment, in particular a protein-rich environment. This result could be attributed to the chelation of Pd(II) by protein functional groups, which may result in stabilization of Pd in the 2+ oxidation state, leading to: an inefficient reduction process, diminishing amount of an active Pd(0) catalyst, and reduced cleavage. Embodiments described herein though are not limited to any particular mechanism of action, and an understanding of the mechanism of action is not necessary to practice such embodiments. However, in some embodiments, the inhibitory effect of the protein environment is overcome by reacting Pd(II) salt with excess phosphine (e.g., 6-fold to 12-fold, 8-fold to 10-fold, etc.) in an aqueous solution for sufficient time to ensure sufficient reduction. For example, the rate of reduction of Pd(II) by TPPTS in water is first order in palladium, zero-order in ligand, and happens at a rate of $1.0 \times 10^{-3}$ s$^{-1}$; corresponding to a half-life of reduction of approximately 8 minutes (Amatore et al. J. Org. Chem. 1995, 60, 6829-6839; incorporated by reference in its entirety). If a strong base (e.g., NaOH) is added, reduction is quantitative and instantaneous (e.g., Kuntz & Vittori. Mol. Cat. A: Chem. 1998, 129, 159-171; incorporated by reference in its entirety).

4. Storage

Although experiments herein demonstrate that preactivated Pd catalyst provides superior performance compared to in situ generated catalyst, particularly in biological environments, e.g., protein-rich environments, in some embodiments, the possibility of oxidation of active catalyst from Pd(0) to Pd(II), by various oxidants, including molecular oxygen (e.g., from the surrounding environment (e.g., air, dissolved oxygen within the aqueous solution, from buffers, etc.), exists. In certain embodiments, sensitivity to oxidants (e.g., atmospheric oxygen, dissolved oxygen, etc.) presents a significant challenge for prolonged storage (e.g., storage for: 1 day, 2 days, 3 days, 4 days, 5 days, 1 week, 2 week, 1 month, 2 months, 6 months, 1 year, 2 years, 5 years, or more, or ranges therebetween (e.g., 1-2 days, 1-3 days, 1-5 days, 1-2 weeks, 1-2 months, 1-6 months, 1-2 years, 1-5 years, etc.)) of Pd catalysts.

In some embodiments, catalyst prepared and stored in sealed vessels (e.g., sealed glass ampules) retains its activity for a prolonged length of time (e.g., 1 day, 2 days, 3 days, 4 days, 5 days, 1 week, 2 week, 1 month, 2 months, 6 months, 1 year, 2 years, 5 years, or more, or ranges therebetween (e.g., 1-2 days, 1-3 days, 1-5 days, 1-2 weeks, 1-2 months, 1-6 months, 1-2 years, 1-5 years, etc.)).

In some embodiments, liquids used in the preparation and/or storage of Pd catalysts are degassed (e.g., under reduced pressure, using a freeze-pump-thaw technique, etc.) to remove dissolved oxygen. In some embodiments, degassing of liquid reagents (e.g., water, buffer, etc.) reduces exposure to oxidants, extends active shelf life, and/or maintains and/or increases catalytic activity (e.g., over time).

In some embodiments, Pd catalysts are prepared and/or stored under inert gas (e.g., nitrogen gas, argon gas, etc.) and/or under vacuum to prevent exposure of the catalyst to oxidant species.

In some embodiments, Pd catalysts are prepared and stored at reduced temperature (e.g., 16° C., 12° C., 8° C., 4° C., 0° C., −4° C., −8° C., −12° C., −16° C., −20° C., −30° C., −40° C., −50° C., −60° C., −70° C., −80° C., or less, or ranges therebetween (e.g. 16 to 12° C., 16 to 8° C., 8 to 4° C., 4 to 0° C., 0 to −4° C., 0 to −8° C., −4 to −12° C., 0 to −80° C.)). In some embodiments, catalyst prepared and stored at reduced temperature retains its activity for a prolonged length of time (e.g., 1 day, 2 days, 3 days, 4 days, 5 days, 1 week, 2 week, 1 month, 2 months, 6 months, 1 year, 2 years, 5 years, or more, or ranges therebetween (e.g., (e.g., 1-2 days, 1-3 days, 1-5 days, 1-2 weeks, 1-2 months, 1-6 months, 1-2 years, 1-5 years, etc.)).

In some embodiments, Pd catalyst is lyophilized for storage. In some embodiments, lyophilized Pd catalyst is stored at a reduced temperature. In some embodiments, catalyst is prepared, lyophilized, and stored (e.g., at reduced temperature (e.g., 16° C., 12° C., 8° C., 4° C., 0° C., −4° C., −8° C., −12° C., −16° C., −20° C., −30° C., −40° C., −50°

C., −60° C., −70° C., −80° C., or less, or ranges therebetween (e.g. 16 to 12° C., 16 to 8° C., 8 to 4° C., 4 to 0° C., 0 to −4° C., 0 to −8° C., −4 to −12° C., 0 to −80° C.)). In such embodiments, catalyst reconstituted into aqueous biological buffer is used without significant loss of activity (e.g., <0.1% activity loss, <0.2% activity loss, <0.5% activity loss, <1% activity loss, <5% activity loss, <10% activity loss). Experiments conducted during development of embodiments herein demonstrate stability of lyophilized catalyst for several months.

5. Other Embodiments

Reduction of Pd(II) to Pd(0) by phosphine itself results in losing one equivalent of phosphine and the generation of 1 equivalent of Phosphine oxide. In some embodiments, provide herein are methods of generating active catalyst without the generation of one equivalent phosphine oxide.

In some embodiments, $Pd_2$(dibenzylideneacetone)$_3$ and/or Pd(dibenzylideneacetone)$_2$ is used as a Pd(0). Such methods have been used in generating active Pd(0) species in organic solvents, but in organic solvents, this method suffers from the fact that dibenzylideneacetone (dba) ligand itself tends to bind to Pd. This results in diminished efficiency. (U.S. Pat. No. 8,981,086; incorporated by reference in its entirety). However, since dba is not soluble in water, and the catalyst is generated without generating 1 equivalent phosphine oxide and without lowering pH (in examples herein, either 2 equivalent of HCl or acetic acid are generated), the issues presented in organic solvent are overcome in the embodiments described herein.

In some embodiments, a Buchwald-type pre-catalyst is used as a Pd source (see, e.g., U.S. Pat. No. 8,981,086; incorporated by reference in its entirety).

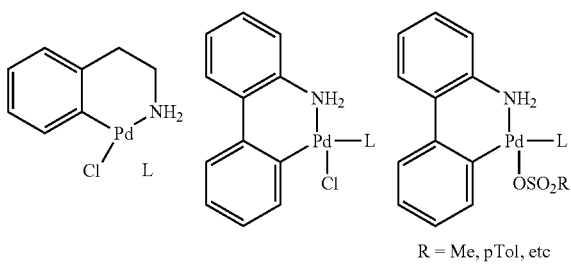

L: = DANPHOS, oDANPHOS, TPPTS etc

In some embodiments, a Buchwald-type precatalyst is used to generate Pd(0).

In some embodiments, other sources of Pd(0) or methods of reduction are within the scope of embodiments herein.

In some embodiments, a non-chelating buffer is used to keep pH from dropping (e.g., below physiologic pH, below neutral pH, etc.). Buffered (e.g., basic) reaction results in faster reduction of Pd(II) to Pd(0). The pH is then adjusted to a more physiological level (e.g., for use in biological environment. In some embodiments, a buffer is used to maintain the pH level during reduction of Pd at a pH from 7.0 to 10.0 (e.g., 7.0, 7.2, 7.4, 7.6, 7.8, 8.0, 8.2, 8.4, 8.6, 8.8, 9.0, 9.2, 9.4, 9.6, 9.8, 10.0, or ranges therebetween (e.g., 7.6-8.6, etc.)).

EXPERIMENTAL

Example 1

Figure 1B:
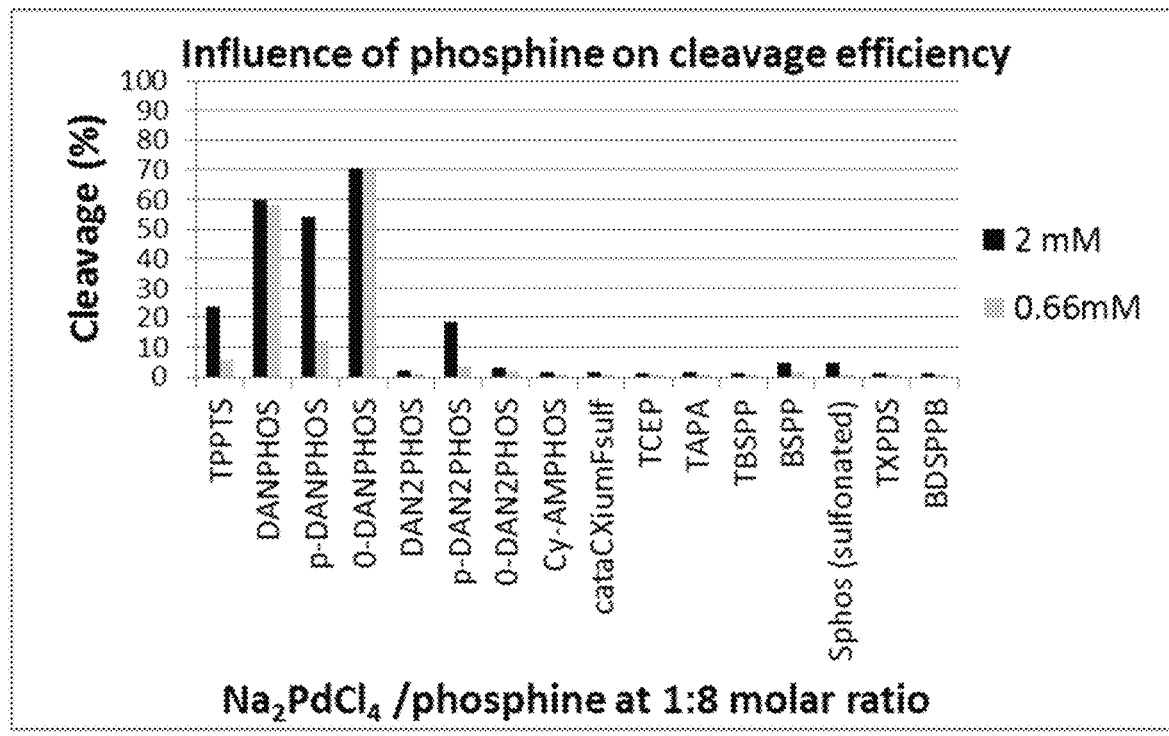
Figure 1B:
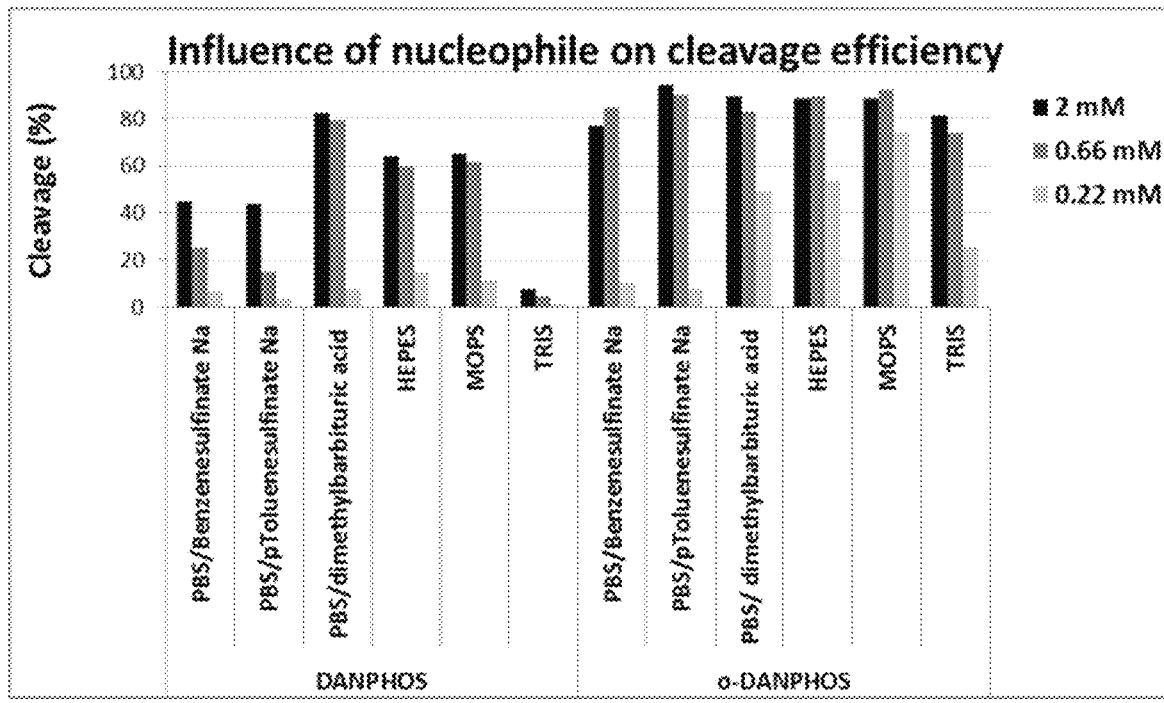

The following example (See, e.g., FIG. 1) demonstrates that the nature of phosphine and nucleophile can affect palladium-catalyzed cleavage of an allyl-carbamate linkage in a proteinaceous environment. In these experiments (FIG. 1B), HaloTag® coated magnetic beads (containing 400 µg immobilized HaloTag® protein) were incubated with 60 µM SL_0288 for 30 min. Control dye, SL_0288, was incubated with beads that do not contain any immobilized HaloTag® protein. Following covalent binding of SL_0288 to the immobilized HaloTag® protein, beads were treated with either 2 mM, 0.66 mM, or 0.22 mM Pd(phosphine) complexes at 1:8 molar ratio for 30 min in HEPES buffer. Cleavage of the allyl-carbamate group would result with release of the dye from the beads. Samples of released dye, together with the control dye, were resolved on SDS-PAGE, scanned on a Typhoon 9400 fluorescent imager, and bands quantitated using ImageQuant. Cleavage efficiency was determined as the percent of released dye relative to control dye. Results in FIG. 1B indicate that the nature of phosphine and nucleophile plays a crucial role in palladium catalyzed cleavage efficiency. Electron-poor phosphines from the DANPHOS family, especially DANPHOS and o-DANPHOS, outperformed TPPTS, a commonly used phosphine. In experiments demonstrated in FIG. 1C, following covalent binding of SL_0288 to immobilized HaloTag protein, beads were treated for 30 min with 2 mM, 0.66 mM, or 0.22 mM Pd(DANPHOS)$_x$ or Pd(o-DANPHOS)$_x$ complexes at 1:8 molar ratio of Pd to phosphine in multiple amine buffers or non-amine buffer containing different nucleophiles. Results indicate that the nature of nucleophile plays a crucial role in palladium-catalyzed cleavage efficiency. In addition, the combination of phosphine and nucleophile is very important. For Pd-DANPHOS complex, the highest cleavage efficiency was achieved using PBS buffer supplemented with 5 mM dimethylbarbituric acid. For o-DANPHOS the highest cleavage efficiency was achieved using MOPS buffer. Furthermore, o-DANPHOS outperformed DANPHOS especially at the 0.22 mM concentrations.

Example 2

The following example (See, e.g., FIG. 2) demonstrates that the nature of phosphine and nucleophile can affect palladium-catalyzed cleavage of an allyl-carbamate linkage in a proteinaceous environment. In these experiments, HaloTag® coated magnetic beads (containing 400 µg immobilized HaloTag® protein) were incubated with 60 µM SL_0288 for 30 min. for 30 min. Control dye, SL_0288, was incubated with beads that do not contain any immobilized HaloTag® protein. Following covalent binding of SL_0288 to the immobilized HaloTag® protein, beads were treated with either 2 mM, 0.66 mM, or 0.22 mM premade Pd(phosphine) complexes at 1:8 molar ratio for 30 min in HEPES or MOPS buffer. Cleavage of the allyl-carbamate group would result with release of the dye from the beads. Samples of released dye, together with the control dye, were resolved on SDS-PAGE, scanned on a Typhoon 9400 fluorescent imager, and bands quantitated using ImageQuant. Cleavage efficiency was determined as the percent of released dye relative to control dye. Results indicate that the nature of phosphine and nucleophile plays a crucial role in palladium catalyzed cleavage efficiency. Electron-poor phosphines from the DANPHOS family, especially DANPHOS and o-DANPHOS, outperformed TPPTS, a commonly used phosphine.

Example 3

Figure 3:
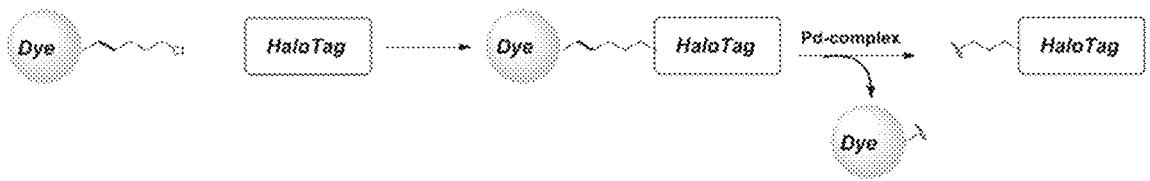
FIG. 3 shows the influence of Pd/o-DANPHOS molar ratio on cleavage efficiency in a proteinaceous environment.
Figure 3:
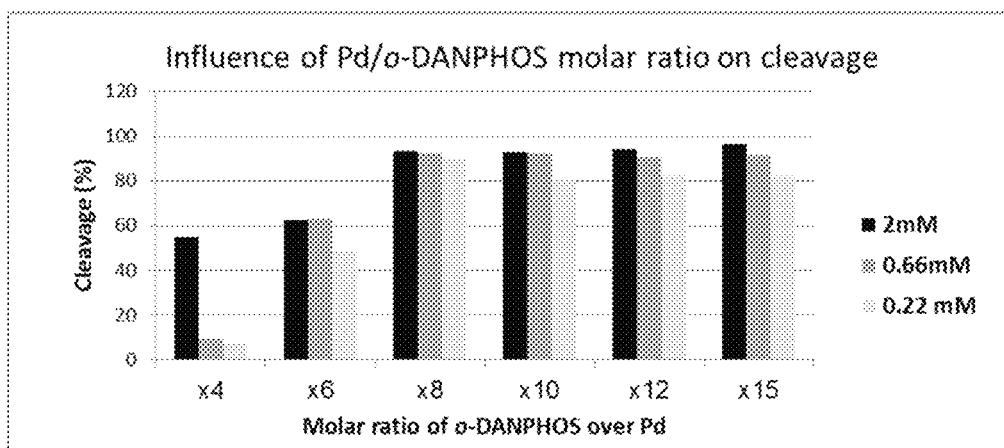

Experiments conducted during development of embodiments described herein demonstrated that the efficiency of palladium-catalyzed cleavage is dependent on the molar ratio of the Pd-phosphine solutions (See, e.g., FIG. 3). In these experiments, HaloTag® coated beads (containing 400 µg immobilized HaloTag® protein) were incubated with 60 µM SL_0288 for 30 min while control dye SL_0288 was incubated with beads that do not contain immobilized HaloTag® protein. Following covalent binding of SL_0288 to the immobilized HaloTag® protein, the beads were treated for 30 min with either 2 mM, 0.6 mM, or 0.22 mM of Pd-o-DANPHOS complex at 1:4, 1:6, 1:8, 1:10, 1:12, and 1:15 molar ratios of Pd to o-DANPHOS. Cleavage of the allyl-carbamate linkage would result with release of the dye from the beads. The released dyes, together with the control dye, were resolved on SDS-PAGE, scanned on a Typhoon 9400 fluorescent imager, and bands quantitated using ImageQuant. Cleavage efficiency was determined as the percent of released dye relative to control dye. Higher cleavage efficiencies were observed for solutions of Pd-o-DANPHOS at a molar ratio of Pd to o-DANPHOS of 1:8 to 1:10.

Example 4

Figure 4:
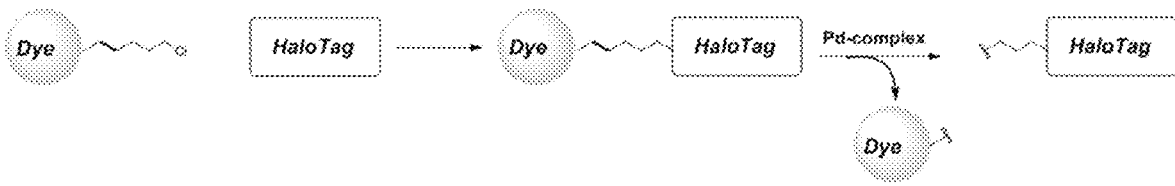
FIG. 4 shows the influence of catalyst preparation on cleavage efficiency in a proteinaceous environment.
Figure 4:
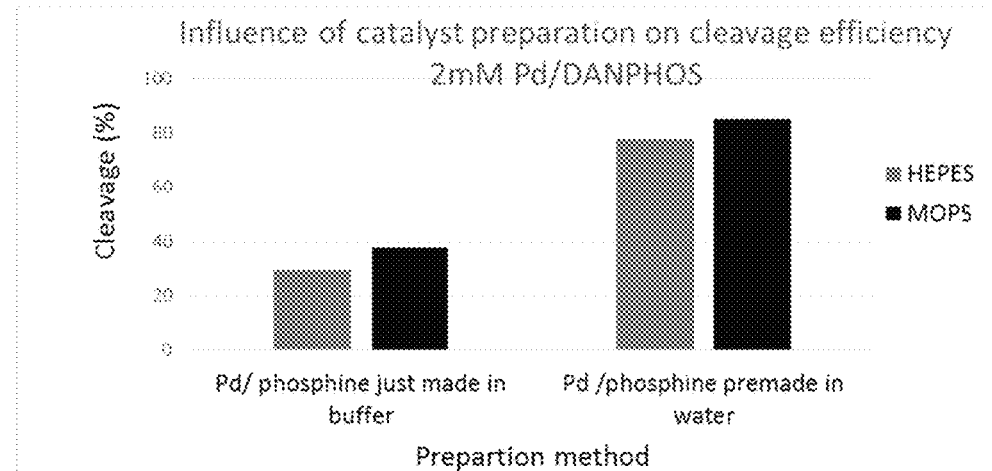

The following example demonstrates that the method for preparing the palladium:phosphine complexes can influence cleavage efficiency in a proteinaceous environment (See, e.g., FIG. 4). Catalyst complexes premade in water and stored under oxygen-depleted conditions are more active than complexes prepared in situ and used immediately. In these experiments, HaloTag® coated beads (containing 400 µg immobilized HaloTag® protein) were incubated with 60 µM SL_0288 for 30 min while control dye SL_0288 was incubated with beads that do not contain immobilized HaloTag® protein. Following covalent binding of SL_0288 to the immobilized HaloTag® protein, the beads were treated for 30 min with 2 mM Pd/DANPHOS complexes. The Pd/DANPHOS complexes were prepared either in HEPES or MOPS buffers and used immediately or premade in water as 4 mM solutions and stored under oxygen depleted conditions. The premade solutions were diluted into the same buffers to create the 2 mM solution and then used immediately. Cleavage of the allyl-carbamate group would result with release of the dye from the beads. The released dyes together with the control dye were resolved on SDS-PAGE, scanned on a Typhoon 9400 fluorescent imager, and bands quantitated using ImageQuant. Cleavage efficiency was determined as the percent of released dye relative to control dye. Higher cleavage efficiency of the allyl-carbamate group was observed with the premade Pd/DANPHOS complexes in both buffers. These results indicate that the premade Pd-phosphine complexes contained higher concentration of active catalyst resulting with higher cleavage efficiency.

Example 5

Figure 5:
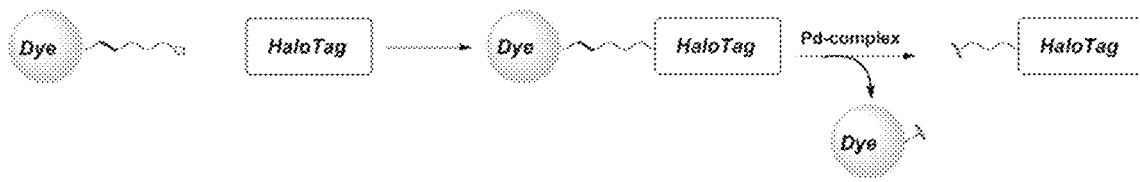
FIG. 5 shows the influence of storage and preparation conditions on cleavage efficiency in a proteinaceous environment.
Figure 5:
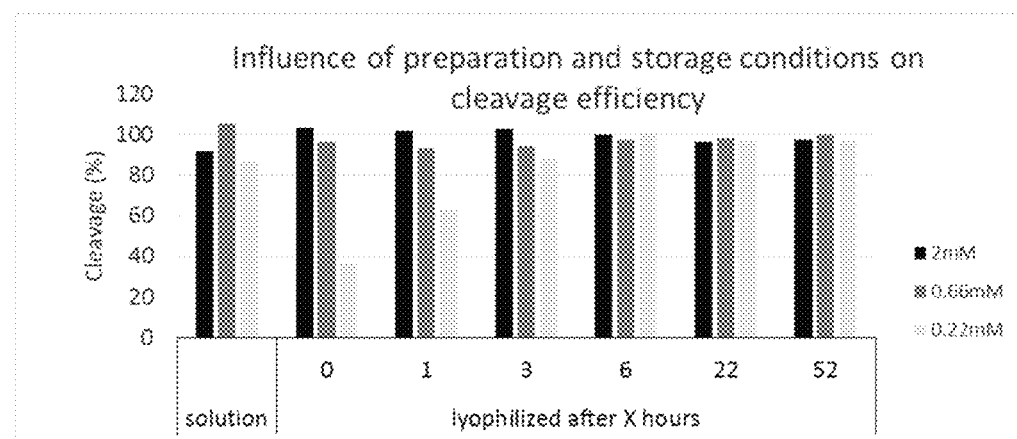

This example demonstrates that the active catalyst can be stored either as a solution in sealed glass ampules or in a lyophilized from (See, e.g., FIG. 5). When lyophilized, it is crucial that the palladium be sufficiently reduced prior to lyophilization. In these experiments, HaloTag® coated magnetic beads (containing 400 µg immobilized HaloTag® protein) were incubated with 60 µM SL_0288 for 30 min while control dye SL_0288 was incubated with beads that do not contain HaloTag® protein. Following covalent binding of SL_0288 to immobilized HaloTag® protein, the beads were treated for 30 min with 0.66 mM Pd/o-DANPHOS, which was prepared from catalyst stored either as a solution or in a lyophilized form (lyophilized immediately or 1, 3, 6, 22, and 52 hours after preparation). Cleavage of the allyl-carbamate linkage would result with release of the dye from the beads. Samples of released dye together with the control dye were resolved on SDS-PAGE, scanned on a Typhoon 9400 fluorescent imager, and bands quantitated using ImageQuant. Cleavage efficiency was determined as the percent of released dye relative to control dye. Results indicate that catalysts stored in solution or lyophilized 6 hours or more after preparation retained their activity.

Example 6

Scheme 1: Preparation for an active catalyst

General procedure for the preparation of catalyst solution:

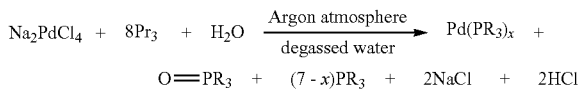

$$Na_2PdCl_4 + 8PR_3 + H_2O \xrightarrow[\text{degassed water}]{\text{Argon atmosphere}} Pd(PR_3)_x + O{=}PR_3 + (7-x)PR_3 + 2NaCl + 2HCl$$

Operations were performed under argon atmosphere (Schlenk technique). Water was degassed by 3× freeze-pump-thaw cycles.

o-DANPHOS (188 mg, 0.32 mmol, 97% pure) was placed in a sealed vial and equipped with stir bar. Air was evacuated, and the vial backfilled with argon (3× repetitions). Degassed water (9 mL) was added via cannula resulting in the formation of a clear solution. In a separate sealed vial, $Na_2PdCl_4$ (11.8 mg, 0.04 mmol) was placed, air evacuated, and the vial backfilled with argon (3× repetitions). Degassed water (1 mL) was added to solid $Na_2PdCl_4$, resulting in the formation of a brown solution. The brown aqueous solution of $Na_2PdCl_4$ (1 mL, 11.8 mg/mL) solution was added to the stirred phosphine solution, resulting in the formation of a clear yellow solution. The clear, yellow solution of Pd-o-DANPHOS complex was allowed to mix for an appropriate amount of time under argon. When a sufficient amount of time had passed, the yellow solution was transferred to a) 1 mL aliquots in glass ampules and fire sealed either under Argon or under vacuum. Solutions stored at 4° C., protected from light;

b) 1 mL aliquots in glass ampules, ampules were sealed with septa and solution carefully frozen on liquid nitrogen and upon lyophilization, glass ampules were fire-sealed and stored at −80° C., protected from light; and c) 1 mL aliquots in septa-sealed glass vials, solution frozen on liquid nitrogen or dry ice and lyophilized. Lyophilized residue was stored in sealed glass vials at −80° C.

Scheme 2: Preparation of an active catalyst from Pd(OAc)₂

General procedure for the preparation of catalyst solution from Pd(OAc)₂:

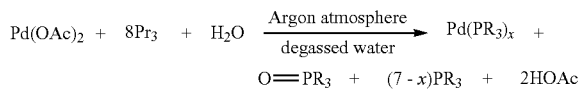

$$Pd(OAc)_2 + 8PR_3 + H_2O \xrightarrow[\text{degassed water}]{\text{Argon atmosphere}} Pd(PR_3)_x + O{=}PR_3 + (7-x)PR_3 + 2HOAc$$

Example for 4 mM Pd-DANPHOS 1:8 Solution

DANPHOS (96 mg, 0.16 mmol, 97% pure) and Pd(OAc)$_2$ (4.5 mg, 0.02 mmol) were placed in a sealed vial equipped with stir bar. Air was evacuated, and the vial backfilled with argon (3× repetitions). Degassed water (5 mL) was added via cannula and upon stirring, resulted in the formation of a clear solution. (Pd(OAc)$_2$ reacts and dissolves slowly). The clear yellow solution of Pd-DANPHOS complex was allowed to mix for 20 hours under argon before packaging into vials.

The efficiency of the catalyst does NOT depend on the Pd source. Both Na$_2$PdCl$_4$ and Pd(OAc)$_2$, have been experimentally shown that under identical conditions, both exhibited very similar efficiencies.

Example 7

Figure 6:
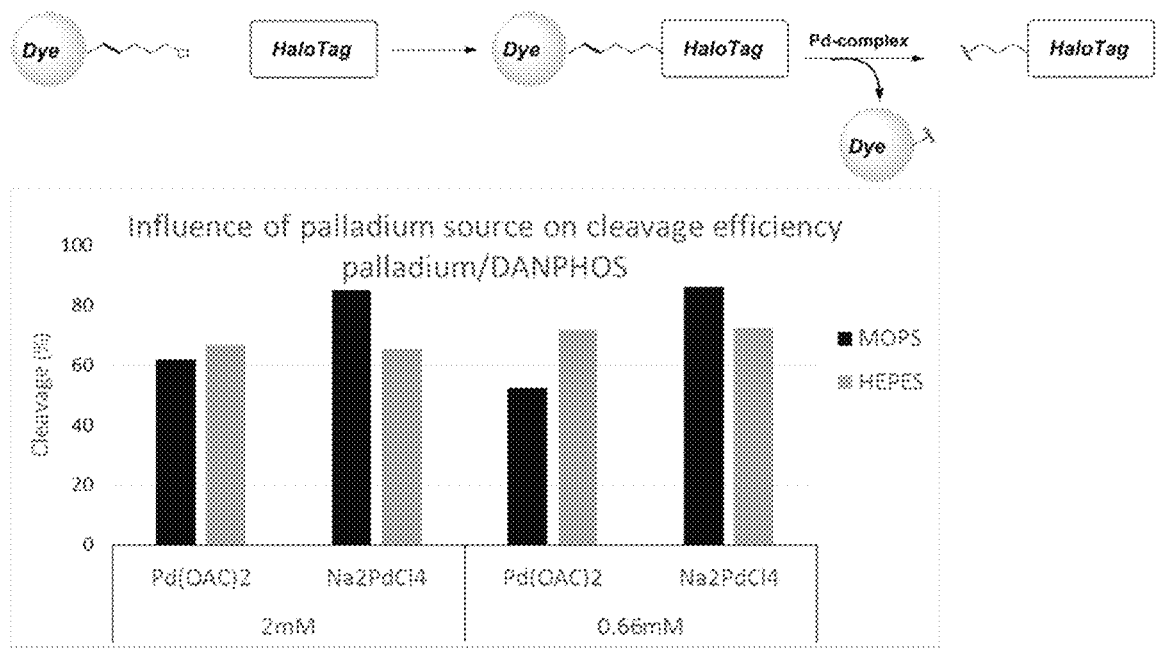
FIG. 6 shows the influence of palladium source on cleavage efficiency in a proteinaceous environment.
Figure 7A:
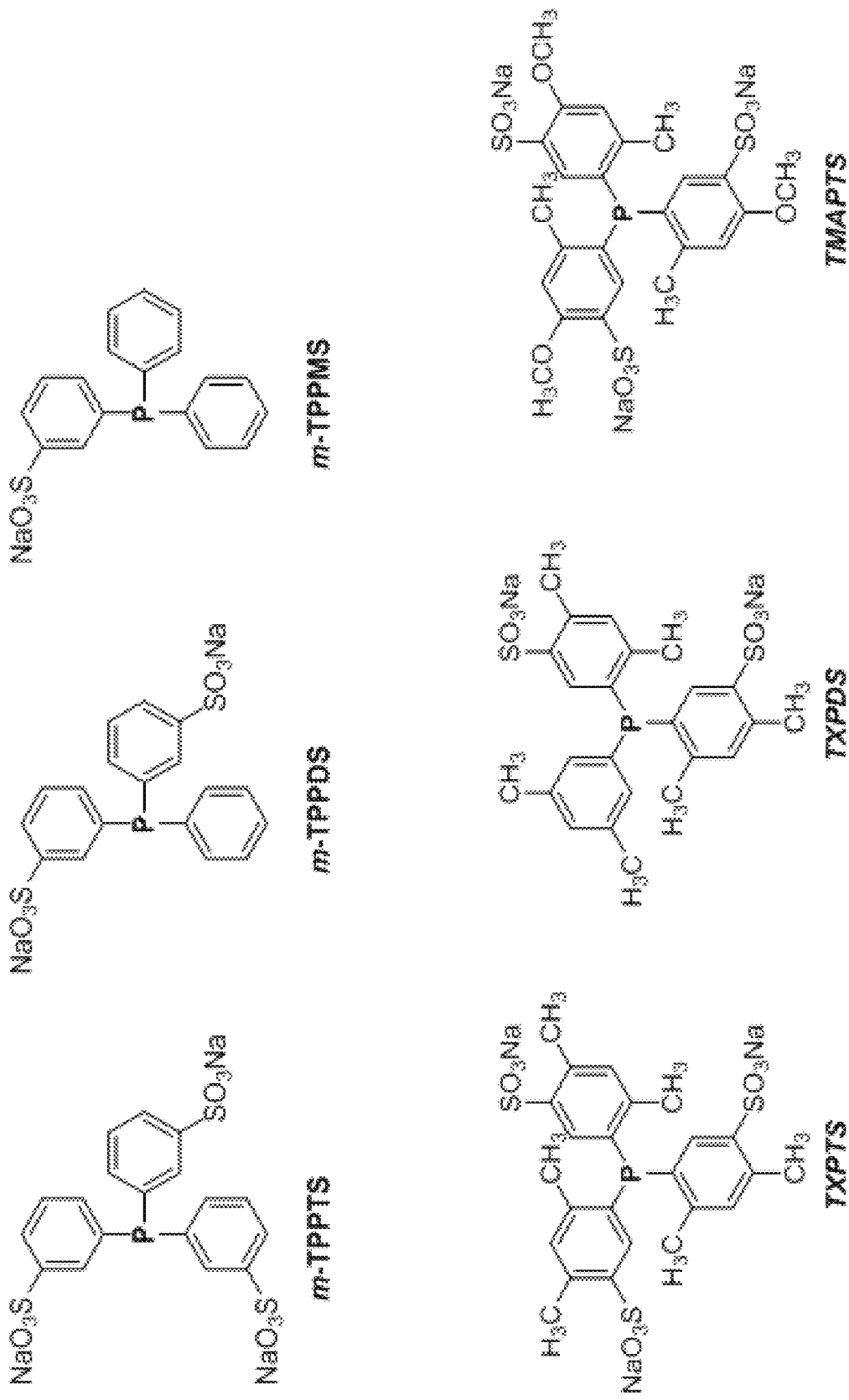
FIGS. 7A-7D show structures of exemplary water soluble phosphines.
Figure 7B:
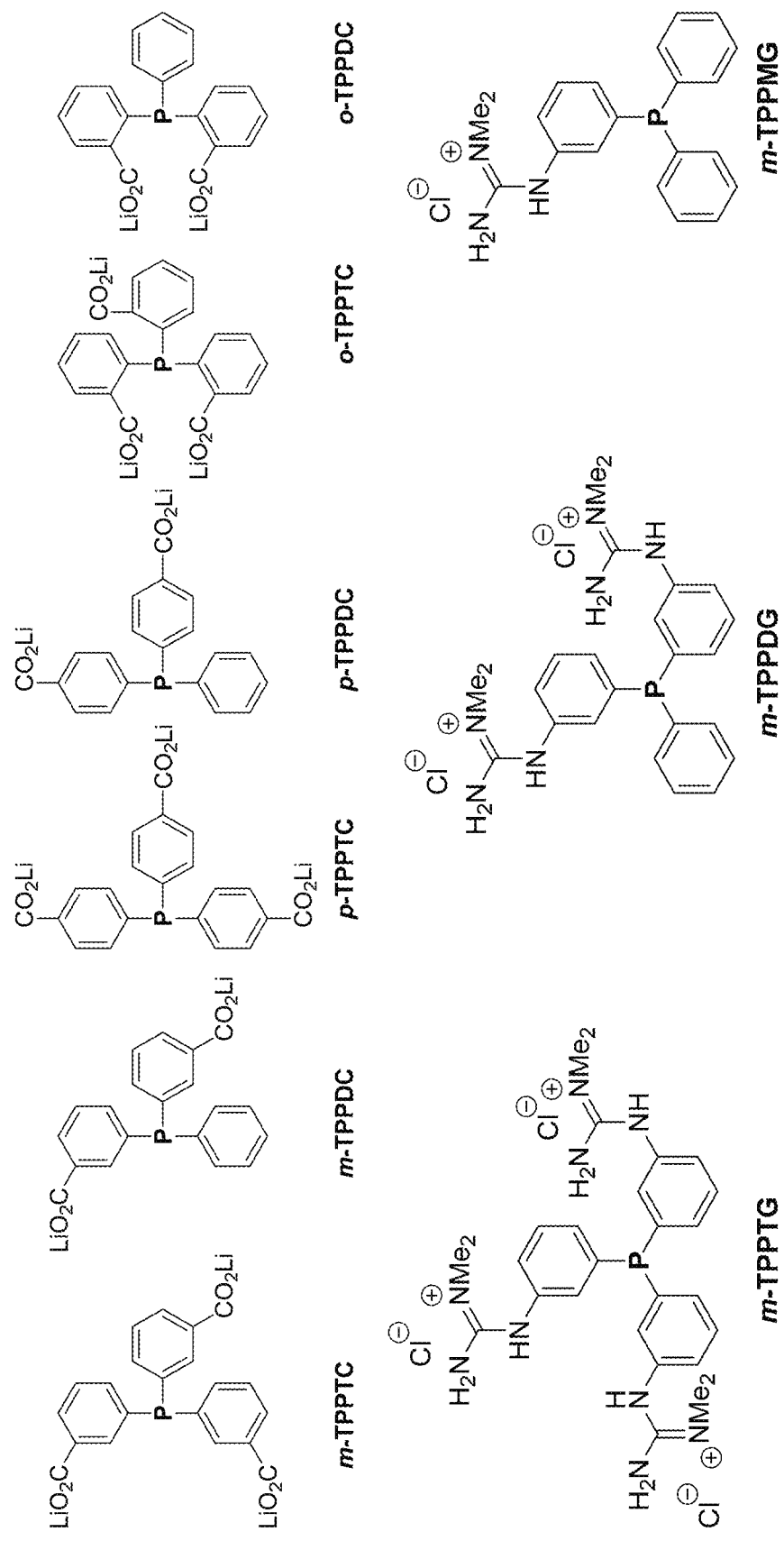
Figure 7C:
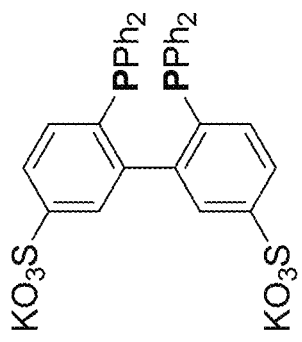
Figure 7C:
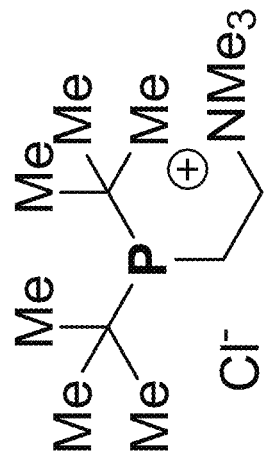
Figure 7C:
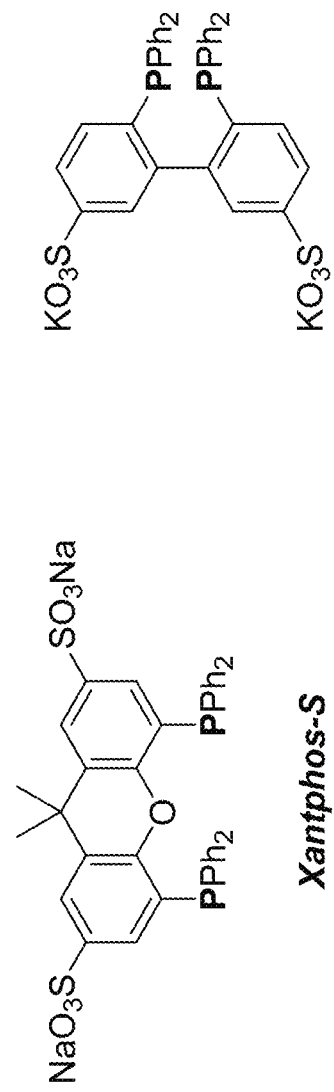
Figure 7C:
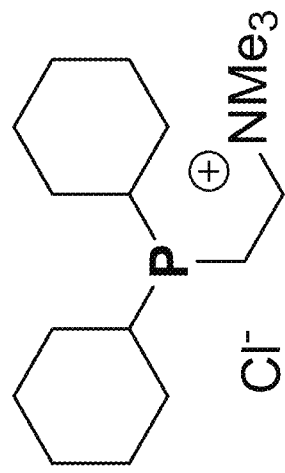
Figure 7C:
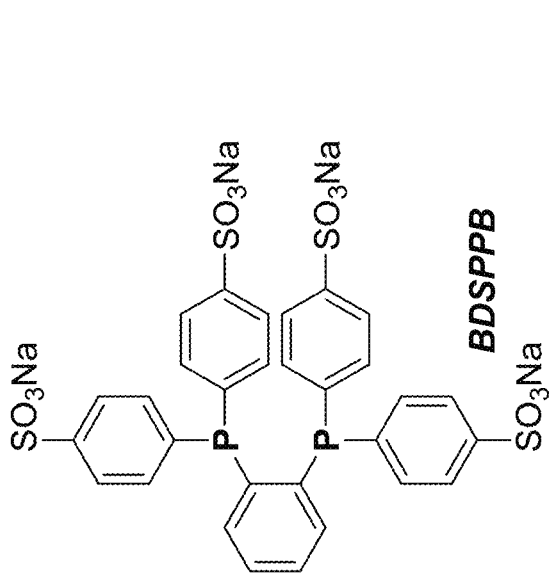
Figure 7D:
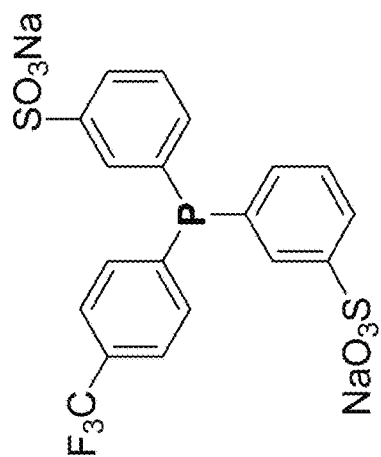
Figure 7D:
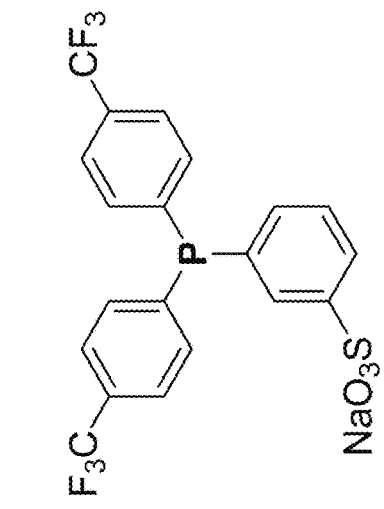
Figure 7D:
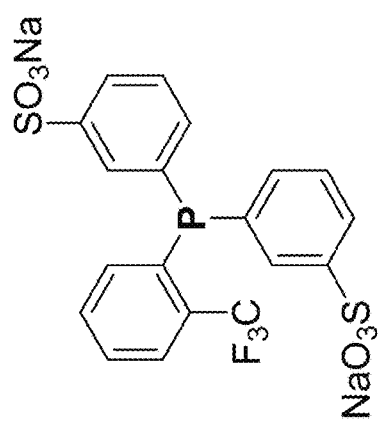
Figure 7D:
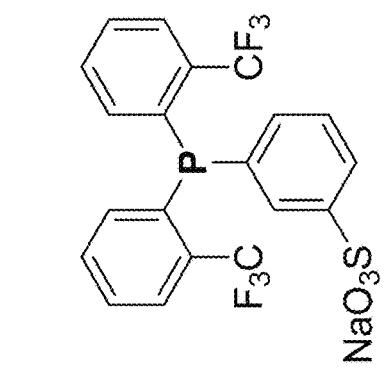
Figure 7D:
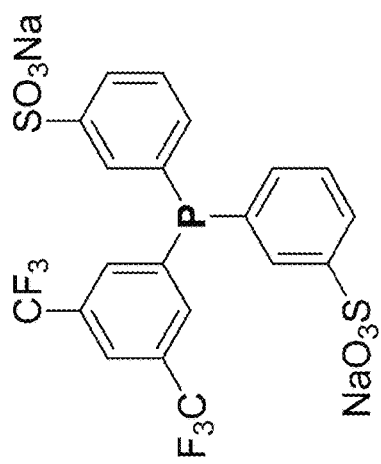
Figure 7D:
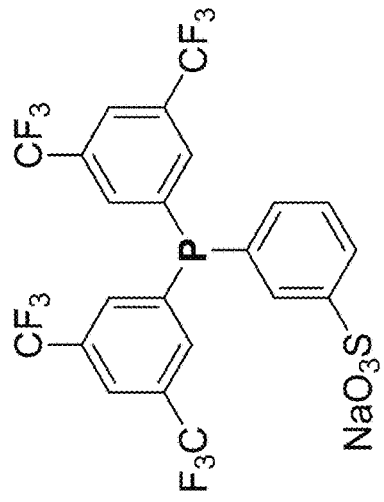
Figure 8A:
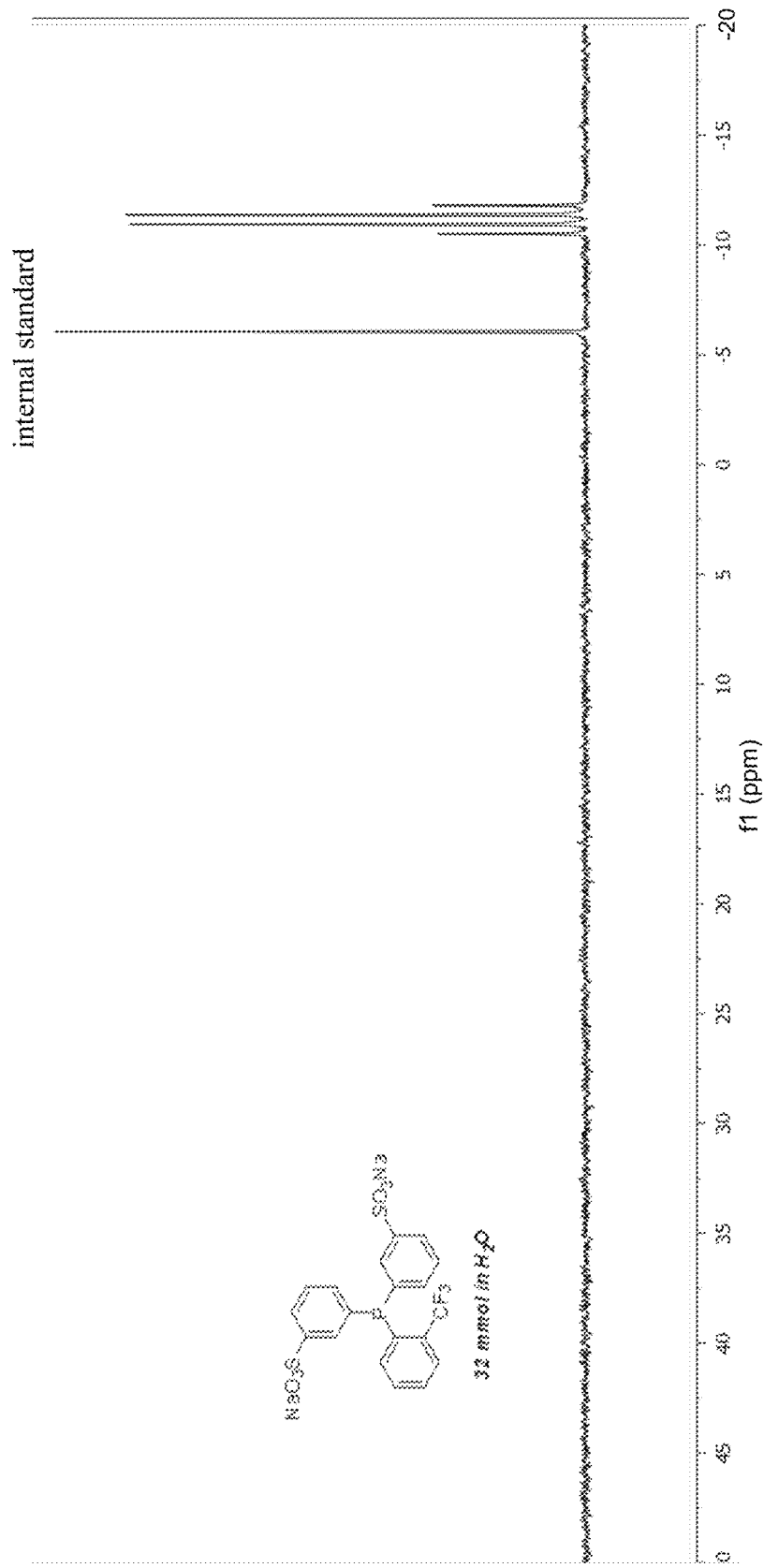
FIG. 8A-D shows 121 MHz $^{31}$P NMR spectrum (locked to $D_2O$ and referenced to pyrophosphate at 22° C.) of (A) o-DANPHOS in $H_2O$, (B) freshly prepared o-DANPHOS-Pd complex in $H_2O$ (C) 4-month old o-DANPHOS-Pd complex (stored in air-free conditions at −80° C.) in $H_2O$ (D) 9-month old o-DANPHOS-Pd complex (stored in air-free conditions at −80° C.) in $H_2O$.
Figure 8B:
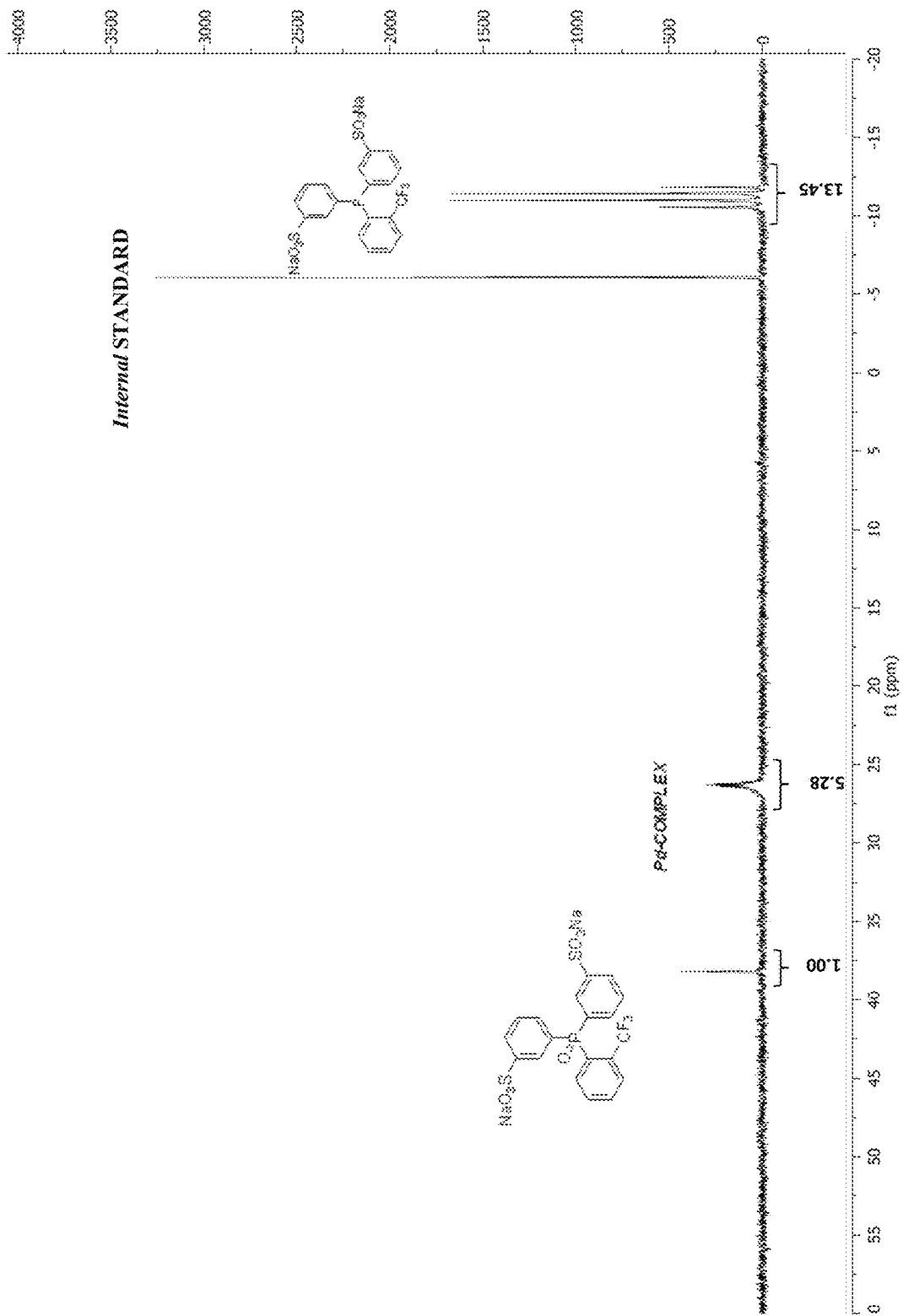
Figure 8C:
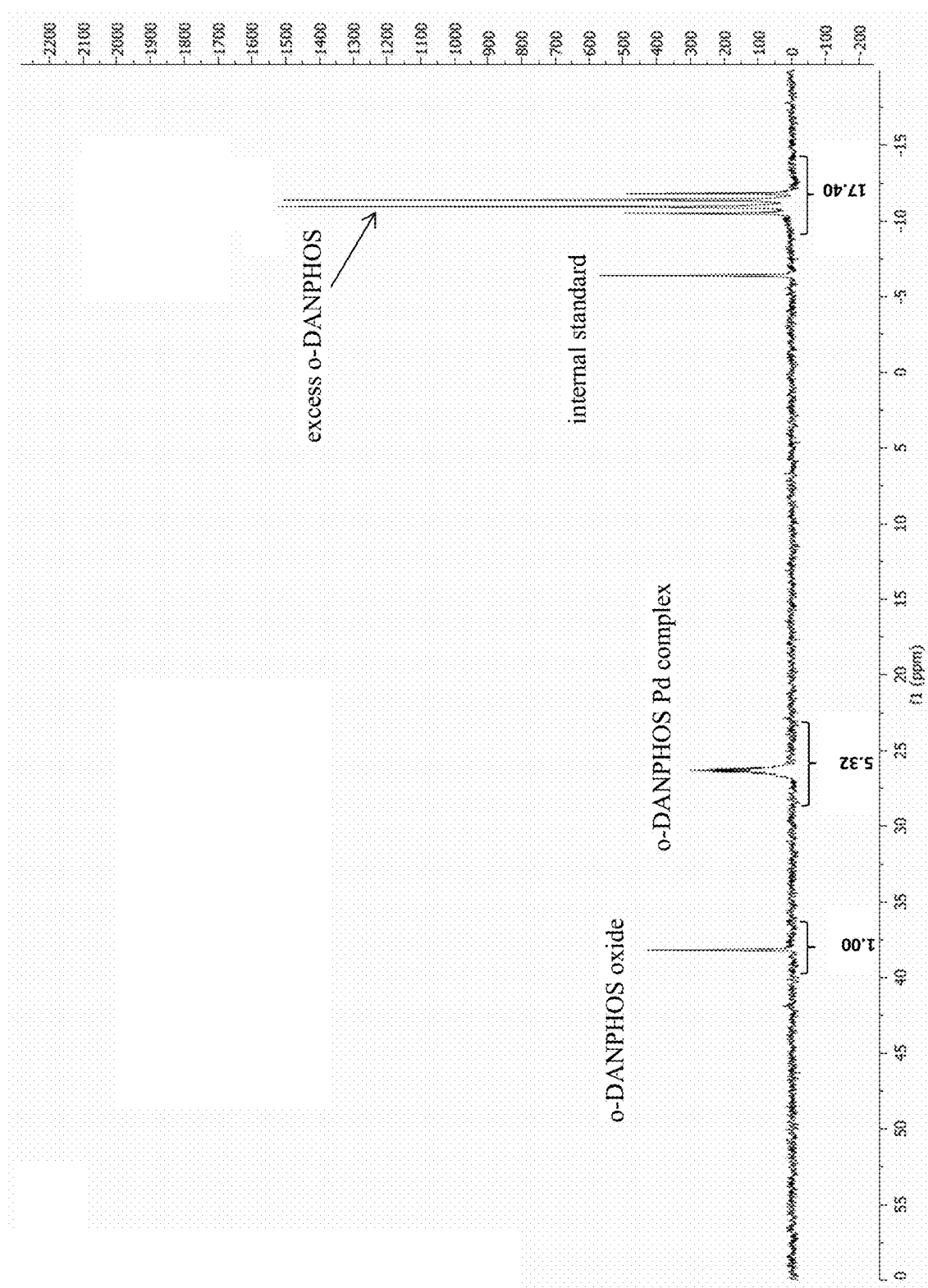
Figure 8D:
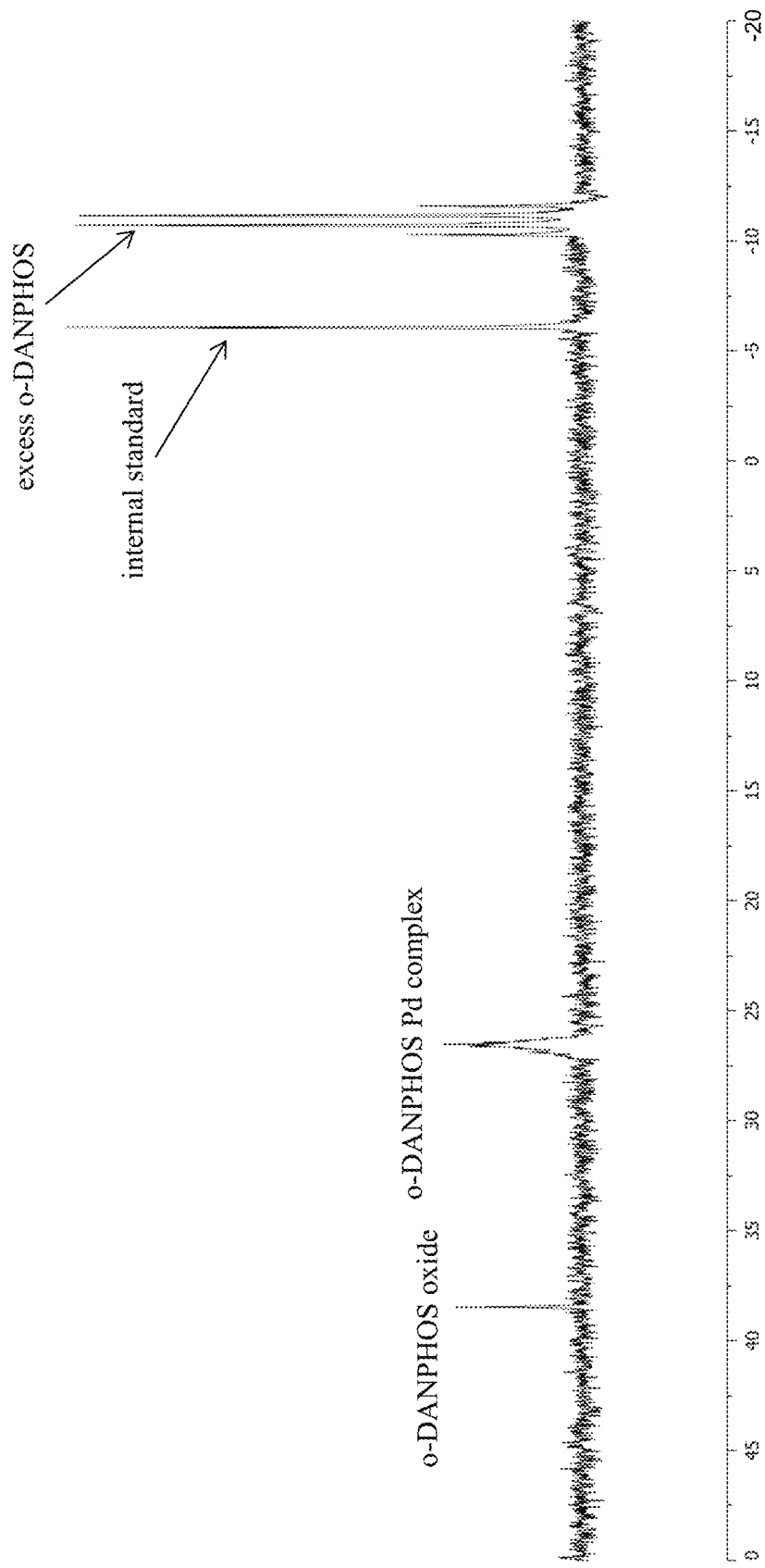

The following example demonstrates that catalysts prepared from two different source of palladium salt have similar reactivity (See, e.g., FIG. 6). HaloTag® coated beads (containing (400 μg immobilized HaloTag® protein) were incubated with 60 μM SL_0288 for 30 min while control dye SL_0288 was incubated with beads that do not contain immobilized HaloTag® protein. Following covalent binding of SL_0288 to immobilized HaloTag® protein, the beads were treated for 30 min with 2 mM Pd/DANPHOS catalyst prepared from two sources of palladium salt Pd(OAC)$_2$ or Na$_2$PdCl$_4$ at 1:8 molar ratios of Pd to phosphine. The Pd/DANPHOS complexes were reconstituted in either in HEPES or MOPS buffers. Cleavage of the allyl-carbamate group would result with release of the dye from the beads. The released dyes together with the control dye were resolved on SDS-PAGE, scanned on a Typhoon 9400 fluorescent imager, and bands quantitated using ImageQuant. Cleavage efficiency was determined as the percent of released dye relative to control dye. Similar cleavage efficiency of the allyl-carbamate group was observed for catalysts prepared from both sources of palladium salt.

Example 8

The following is an exemplary procedure for the preparation of a Pd catalyst solution:

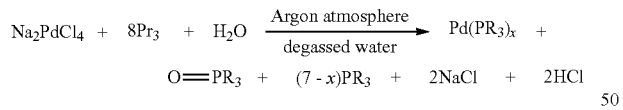

In some embodiments, steps are performed under inert atmosphere (e.g., argon). Water was degassed by 3× freeze-pump-thaw cycles on liquid nitrogen. In some embodiments, any of the preparation/formulation/storage steps or techniques described herein, or any other reagents/components described herein, may be incorporated into this procedure. Likewise, variations on this procedure that are either within the scope herein or within the skill of one in the field are contemplated.

Example 9

Stability of Pd Catalyst in Lyophilized Form

The following example shows $^{31}$P NMR studies of the stability of Pd catalyst prepared in Example 6(c) that had been stored in lyophilized form at −80.0 for 9 months. Functionally, the 9-month-old catalyst showed cleavage efficiency in proteinaceous environment that was indistinguishable from freshly prepared. Both $^{31}$P NMR and cleavage efficiency proved that when stored properly Pd-catalyst retains its efficiency (See FIG. 8A-8D).

Figure 9:
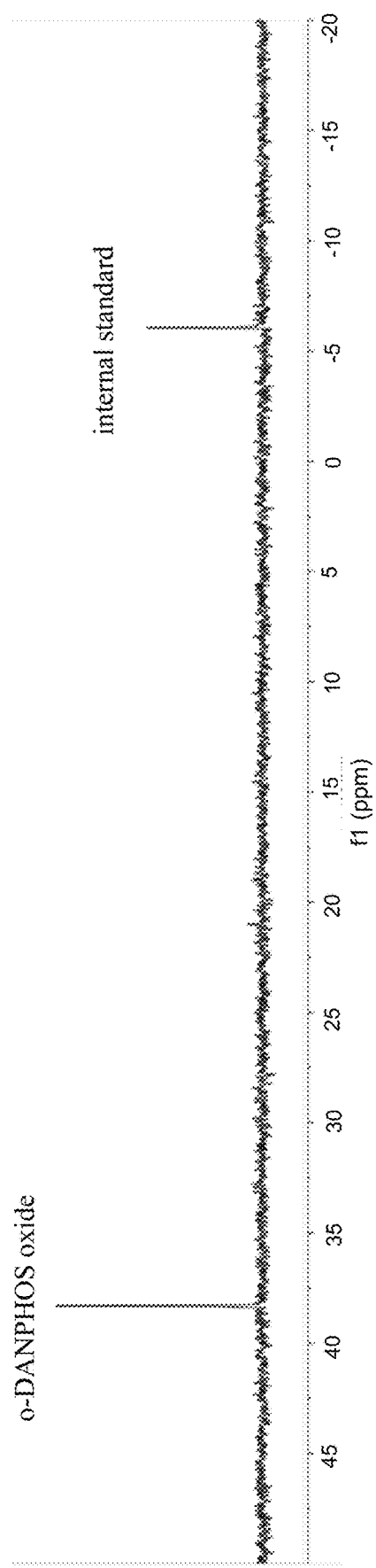
FIG. 9 shows 121 MHz $^{31}$P NMR spectrum of 1-month old o-DANPHOS-Pd complex (stored in aqueous solution at ambient temperature without complete exclusion of air) in $H_2O$ (locked to $D_2O$ and referenced to pyrophosphate at 22° C.).

Improper storage of catalyst (e.g., in solution around ambient temperature and when air is not fully excluded) resulted in complete oxidation of o-DANPHOS to o-DANPHOS-oxide and thus deactivation of active Pd-catalyst. FIG. 9 demonstrates that, after a month of improper storage, the catalyst prepared in Example 6(c) fully decomposed and only o-DANPHOS-oxide was detected by $^{31}$P NMR.

Various modification and variation of the described methods and compositions of the invention will be apparent to those skilled in the art without departing from the scope and spirit of the invention. Indeed, various modifications of the described modes for carrying out the invention that are obvious to those skilled in the relevant fields are intended to be within the scope of the following claims.

The invention claimed is:

1. A Pd catalyst composition comprising phosphine-coordinated palladium (0) species, wherein phosphine ligand is present at 6-12 fold molar excess over palladium in the composition, wherein the phosphine ligand is selected from the group consisting of:

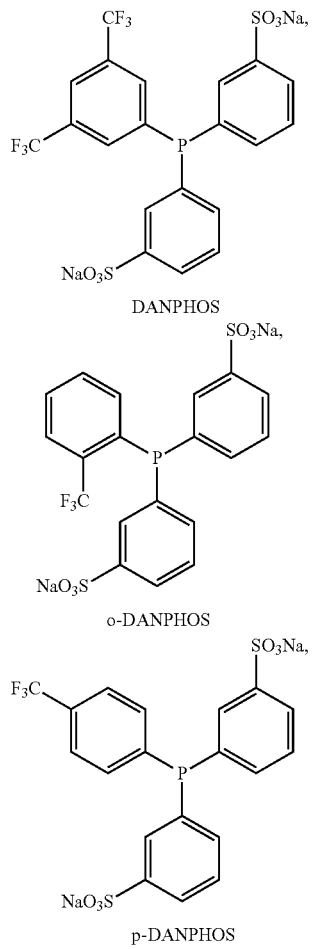

-continued

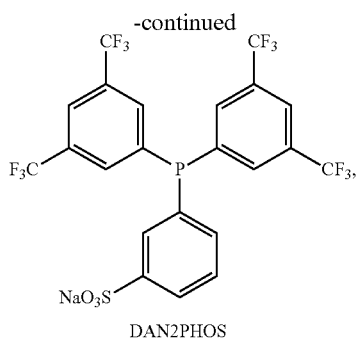
DAN2PHOS

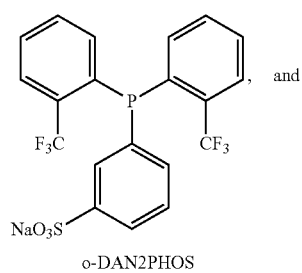
o-DAN2PHOS

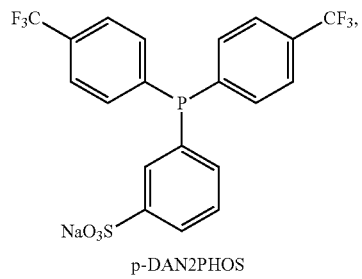
p-DAN2PHOS and wherein the Pd catalyst composition is lyophilized to dryness from aqueous solution and stored under an inert atmosphere.

2. The Pd catalyst composition of claim 1, wherein the phosphine ligand is o-DANPHOS.

3. The Pd catalyst composition of claim 1, wherein the palladium is provided as a Palladium(II) salt selected from the group consisting of: Palladium acetate (Pd(OAc)$_2$), Palladium trifluoroacetate (Pd(TFA)$_2$), Palladium nitrate (Pd(NO$_3$)$_2$), Palladium chloride (PdCl$_2$), Palladium bromide (PdBr$_2$), Sodium tetrachloropalladate (Na$_2$PdCl$_4$), Potassium tetrachloropalladate (K$_2$PdCl$_4$), Lithium tetrachloropalladate (Li$_2$PdCl$_4$), Sodium tetrabromopalladate (Na$_2$PdBr$_4$), Potassium tetrabromopalladate (K$_2$PdBr$_4$), Pd$_2$(dibenzylideneacetone)$_3$, Pd(dibenzylideneacetone)$_2$, and Buchwald precatalysts.

4. A method for the preparation of the Pd catalyst composition of claim 1, comprising combining a palladium(II) salt with a phosphine ligand in buffered or un-buffered water to form the Pd catalyst, lyophilizing the Pd catalyst to dryness, and storing the Pd catalyst under an inert atmosphere, wherein the phosphine ligand is selected from the group consisting of:

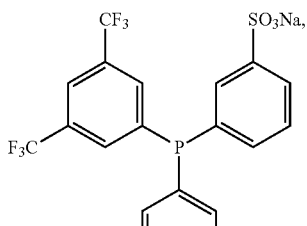
DANPHOS

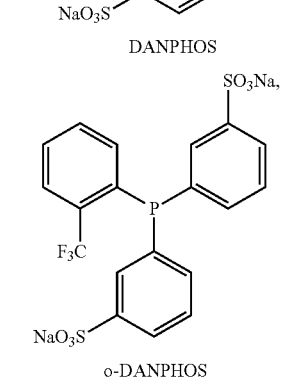
o-DANPHOS

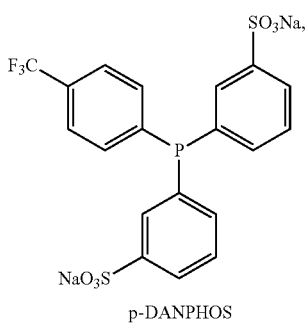
p-DANPHOS

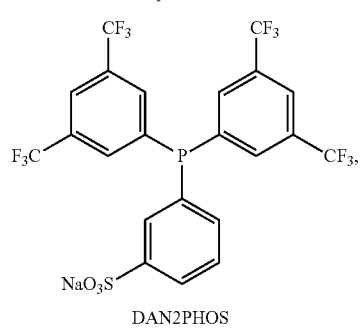
DAN2PHOS

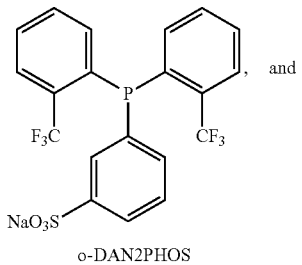
o-DAN2PHOS

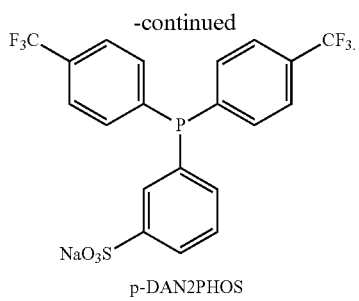

p-DAN2PHOS

5. The method of claim 4, wherein the phosphine ligand is o-DANPHOS.

6. The method of claim 4, wherein the palladium is provided as a Palladium(II) salt selected from the group consisting of: Palladium acetate (Pd(OAc)$_2$), Palladium trifluoroacetate (Pd(TFA)$_2$), Palladium nitrate (Pd(NO$_3$)$_2$), Palladium chloride (PdCl$_2$), Palladium bromide (PdBr$_2$), Sodium tetrachloropalladate (Na$_2$PdCl$_4$), Potassium tetrachloropalladate (K$_2$PdCl$_4$), Lithium tetrachloropalladate (Li$_2$PdCl$_4$), Sodium tetrabromopalladate (Na$_2$PdBr$_4$), Potassium tetrabromopalladate (K$_2$PdBr$_4$), Pd$_2$(dibenzylideneacetone)$_3$, Pd(dibenzylideneacetone)$_2$, and Buchwald precatalysts.

7. The method of claim 4, wherein the water is oxygen-depleted.

8. The method of claim 7, further comprising a step of degassing the water prior to the combining step.

9. The method of claim 4, wherein the palladium(II) salt and the phosphine ligand are combined by stirring or agitation.

10. The method of claim 4, further comprising a step of dissolving the palladium(II) salt in water and dissolving the phosphine ligand in water prior to the combining step.

11. The method of claim 4, further comprising a step of buffering the Pd catalyst after the combining step.

12. The method of claim 11, wherein the Pd catalyst is buffered at a pH between 6.5-8.0.

13. The method of claim 11, wherein the buffer is selected from the group consisting of 4-(2-hydroxyethyl)-1-piperazineethanesulfonic acid (HEPES), 3-(N-morpholino)propanesulfonic acid (MOPS), tris(hydroxymethyl)aminomethane (TRIS), phosphate-buffered saline (PBS)+Benzenesulfinate Na, phosphate-buffered saline (PBS), p-Toluenesulfinate Na, dimethylbarbituric acid, and combinations thereof.

14. The method of claim 4, further comprising a step of reconstituting the lyophilized Pd catalyst in a buffer.

15. The method of claim 4, wherein the combining is performed under inert atmosphere.

* * * * *